United States Patent [19]

Daniel

[11] Patent Number: 4,676,393
[45] Date of Patent: Jun. 30, 1987

[54] FUEL TANK CAP FOR GENERAL USAGE
[76] Inventor: Paul C. Daniel, P.O. Box 37563, Phoenix, Ariz. 85069
[21] Appl. No.: 887,837
[22] Filed: Jul. 21, 1986
[51] Int. Cl.$^4$ ............................................. B65D 45/28
[52] U.S. Cl. .................................... 220/323; 220/326; 281/DIG. 33
[58] Field of Search ........ 220/281, 323, 326, DIG. 33
[56] References Cited

U.S. PATENT DOCUMENTS 1,847,117  3/1932  Lantero ................................ 220/323
3,221,918 12/1965  Callegari ............................. 220/323

Primary Examiner—George T. Hall
Attorney, Agent, or Firm—William W. Holloway

[57] ABSTRACT

A cap for a fuel tank includes a base member for structural support, a fuel-impervious material for providing a seal between the base member and an opening in the fuel tank, a contractible member extending through the base member for engaging and interior of the fuel tank (including a filling tube for the fuel tank, and a flexible member coupled to the base member and enclosing the extension of the contractible member and preventing leakage of fuel and/or associated vapors therethrough.

18 Claims, 6 Drawing Figures

FUEL TANK CAP FOR GENERAL USAGE

BACKGROUND OF THE INVENTION

1. FIELD OF THE INVENTION

This invention relates generally to the containment of fuel in motor vehicles and, more particularly, to a fuel tank cap that can be used with a multiplicity of models of motor vehicles.

2. DESCRIPTION OF THE RELATED ART

With the proliferation of vehicle models, especially automobiles and trucks, a multiplicity of caps have been used to close and seal the filler tube of the vehicle fuel tank. This multiplicity of caps has resulted in difficulty in replacing a fuel tank cap that has been lost or damaged. Vehicle parts suppliers generally maintain an inventory of caps having a high demand, but, except for very large outlets, maintaining a complete inventory of caps for fuel tank filler tubes for both current and for discontinued models is generally uneconomical. Frequently, the vehicle distributor network can provide all of the the cap(s) for the vehicles supplied by the parent company. However, the local distributorship may not be easily accessible and may not maintain an inventory of fuel caps for vehicles no longer manufactured by the parent organization.

In the related art, attempts has been made to provide a fuel cap that would useful for a plurality of fuel filler tubes. For example, in U.S. Pat. No. 2,006,747 by Ritz-Woller, an expandable member is disclosed that can engage the flange at the opening of the fuel tank filler tube. The cap disclosed by this reference is removed by applying pressure to the outer portion of the cap. It will be clear that an impact of sufficient force or a increase in the internal pressure of the tank, such as can be caused by a heating of contained fuel, may cause the cap to be forced out of the filler tube. In addition, the effectiveness of the fuel tank cap of this invention is compromised where the filler tube does not have a rim.

U.S. Pat. No. 3,130,025 by Bowden et al. describes a breather cap that is coupled to a tube by means of a spring element 52 of FIG. 2 of that reference. The spring element, as described in detail in the reference, provides for a secure coupling to the tube, but the spring element will not couple to a wide variety of tube diameters nor is the specific structure described reflected in the structure of the instant invention.

A need has therefore been felt for a cap for a fuel tank filler tube that is economical, that can be used with a multiplicity of filler tube types and diameters and that generally requires a positive action by a user to remove the cap from the filler tube.

OBJECTS OF THE INVENTION

It is an object of the present invention to provide an improved cap for a fuel system.

It is yet another object of the present invention to provide a cap for a fuel system that can be accommodated by a multiplicity of filler tube configurations and filler tube diameters.

It is still another object of the present invention to provide a fuel tank filler tube cap that can be easily removed from and attached to the filler tube.

SUMMARY OF THE INVENTION

The aforementioned and other objects are accomplished, according to the present invention, by a fuel tank cap in which the two arms are forced apart, generally by a spring mechanism, and forcibly engage the sides of a the fuel tank or the sides of a filler tube of the fuel tank. The arms extend above the opening to the fuel tank into a position where a user can apply a force counter to the force of the spring, disengage the arms from the sides of the tank or filler tube and remove the filler tube cap. The arms can be extended to engage filler tube walls having generally cylindrical shapes with a range of diameters. The arms are fabricated with a structure to engage the rim or flange of the opening of the filler tube, when such a structure is present, thereby reducing the chances of accidental removal of the cap. The cap has a ring of flexible material to seal the cap against the rim of the tank of a flexible material to permit manipulation of the arms without leakage of the fuel. The portions of the arms engaging the sides of the filler tube are fabricated in a manner to increase the gripping action. These and other features of the present invention will be understood upon reading of the following description along with the drawings.

DESCRIPTION OF THE PREFERRED EMBODIMENT

1. Detailed Description of the Figures

Figure 1:
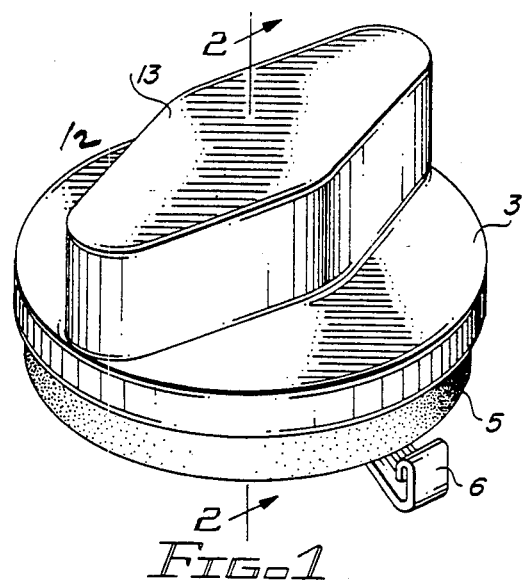
FIG. 1 is a perspective view of the fuel tank cap according to the present invention.

Referring first to FIG. 1, a perspective view of the fuel tank cap 1 of the present invention is shown. The cap includes a base member 3 and a ring 5 of compressible material, the material further being relatively impervious to the fuel, coupled to the base member 3. A flexible covering 13 (also relatively impervious to the fuel) is coupled to a top of the base member 3 and two arms (of which only arm 6 is shown) extending from the bottom of fuel tank cap 1.

Figure 2A:
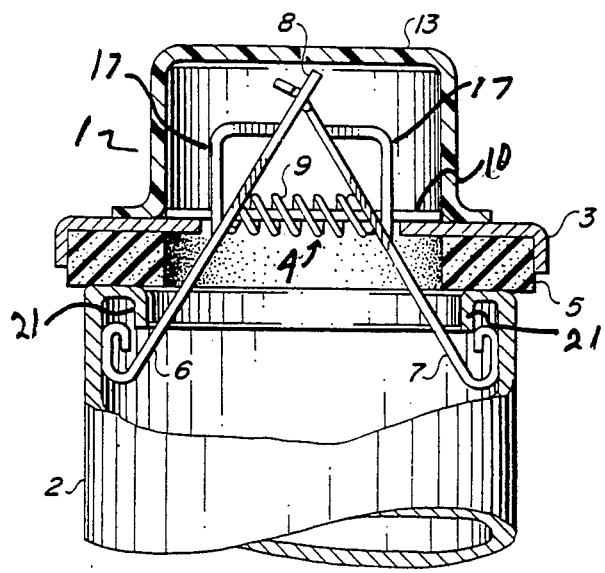
FIG. 2A and FIG. 2B illustrate a cross-sectional view of a first embodiment of the fuel tank cap in an operational configuration with respect to the fuel tank and in the configuration for attachment to or removal from the fuel tank respectively.

Referring next to FIG. 2A, a cross-sectional view, as seen from the 2—2 position in FIG. 1, is shown illustrating the operational relationship of the fuel tank cap 1 to the filler tube 2. The base member 3 provides the structural support for the remainder of the cap 1. Coupled to the base member 3 is a ring 5 of compressible or deformable material. When the cap 1 is in the operational position, the ring material 5 forms a seal between the filler tube 2 (including flange or rim structure 21) and the fuel tank cap 1. The base member 3 has an aperture 4 formed generally in the center of the base member 3. Extending across the aperture 4 and coupled to one side of the portion of the base member forming the aperture is a pin 10. The arms 6 and 7 extend through aperture 4 and are constrained to move along pin 10. For example, the arms 6 and 7 can have apertures formed therein and the pin 10 can pass through the arm apertures. The two arms are coupled at ends 8 of the arms extending above the plane of the base member 3. The pin 10 extends through a spring 9 and the spring 9 is positioned relative to the arms in such a manner so as to provide extension of the ends of the arms 6 and 7 below the base member 3 (along with ring 5) to a distance determined by the structure of aperture 4 of the fuel cap or until contact is made with the sides of the filler tube or fuel tank. A flexible cover 13 is coupled to the base member 3 and encloses the aperture 4 and the arms 6 and 7. Two extension members 17 are coupled to arms 6 and 7 and allow the arms to be gripped more easily through flexible cover 13.

Figure 2B:
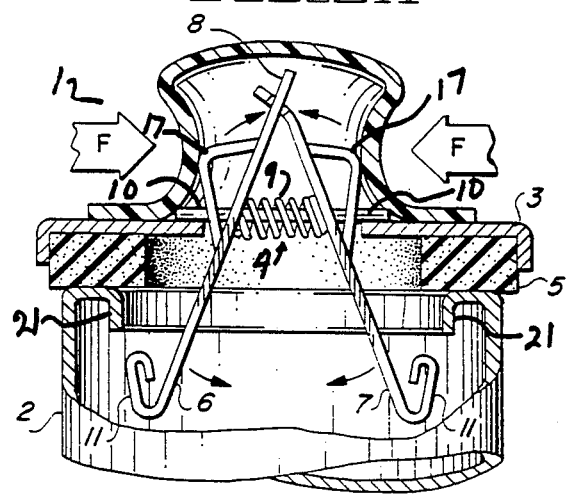

FIG. 2B illustrates how a force F exerted on the sides of flexible cover 13 and on the extension members 17 results in the removal of the arm ends 11 from the walls or sides of the fuel tank permitting the attachment of the fuel tank cap to or the removal of the fuel tank cap from the fuel tank.

The implementation of spring mechanism 9 of FIG. 2 can require an aperture 4 that limits the range of filler tube diameters with which the cap 1 can be used. In order to provide a smaller aperture 4, the spring arrangement illustrated in FIG. 3A and FIG. 3B can be used. In this embodiment, the arms 6 and 7 extend through aperture 4 and can be structured to be coupled to the aperture 4 by structure in of the arms 6 and 7, such as grooves (not shown) that can engage the sides of the aperture. A spring 32 can engage the arms and force the corresponding ends 11 of the spring apart. The portions of the arms extending above the base member 3 can have a structure 33 that permits convenient manipulation for forcing the arm ends 11 closer together. According to yet another embodiment, spring 32 can be replaced by a spring mechanism 34, either above or below the base member 3, that maintains the arms in the operational position.

The primary mechanism for the securing of the fuel tank cap is the friction of the arms against the walls of the fuel tank or the filler tube. The typical description of force of friction is provided in terms of the coefficient of friction, wherein the force required to move a body along a surface is proportional to the force between the body and the surface. Therefore, the stronger the force exerted by the spring, the more force will be required to move the cap. Similarly, the coefficient of friction depends on the physical interface between the body and the surface as well as the area of contact between the body and the and the surface. With respect to the physical interface, the surfaces 11 of the arms 6 and 7 in contact with the (filler tube of the) fuel tank can be roughened or a course material applied thereto to increase the coefficient of friction. To increase the area of contact between the arms and the (filler tube of the) fuel tank, the end of the arms 11 are curved as shown in the cross-sectional view of FIG. 2. In addition, the arm structure 11 can have convex curvature in the dimension perpendicular to the plane of the cross-sectional view to increase the area of contact with the walls of the cylindrical filler tube 2.

Figure 4:
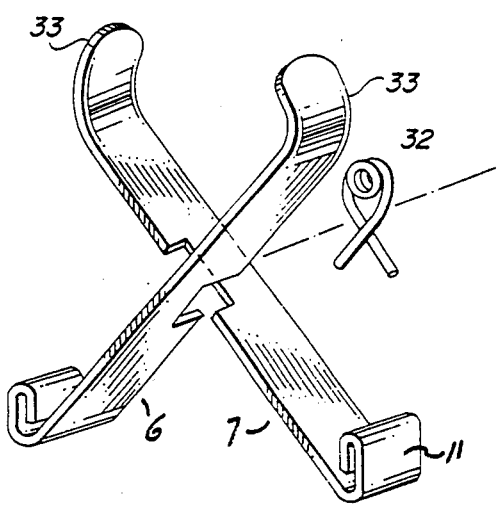
FIG. 4 is a perspective view illustrating the relationship between the spring and the fuel tank cap arms for the embodiment illustrated in FIGS. 3A and 3B.

Referring now to FIG. 4, the fuel tank cap arms, 6 and 7, are shown in an exploded perspective view. The spring 32 is coupled to the two arms, 6 and 7, and the coil of the spring 32 provides a force that forces the arms against the side of the fuel tank in the operational position. The arms 6 and 7 can be coupled to base member 3 by grooves in the arms, by a pin through apertures in the arms, by a pin though the coil of spring 32 or by any of a variety of other coupling mechanisms.

2. Operation of the Preferred Embodiment

The operation of the present invention can be understood in the following manner. The arms, being forced apart (by a spring in the preferred embodiment), can expand to engage a tube of diameter limited only by the structure of the cap, e.g. the width of the aperture in the base member. Portions of the ends of the arms, the portions that engage the walls of the fuel tank, are shaped into a curved structure to increase the area of contact with the walls without regard to the magnitude of the extension of the arms. The curved structure can be provided with a surface texture, such as when the surface is abraded, to enhance the frictional contact between the arms and the fuel tank walls. In addition, the arms have a structure that can engage the rim of the filler tube, when such structure is present, reducing the risk of accidental cap removed.

Figure 3A:
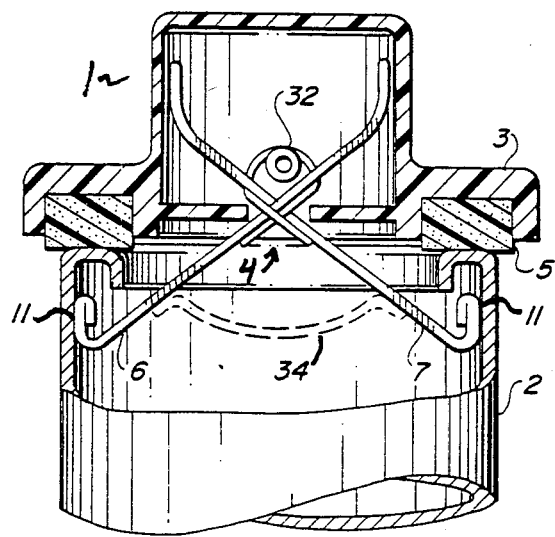
FIG. 3A and FIG. 3B illustrate a cross-sectional view of a second embodiment of the fuel tank cap in an operational configuration with respect to the fuel tank and in the configuration for attachment to or removal from the fuel tank respectively.
Figure 3B:
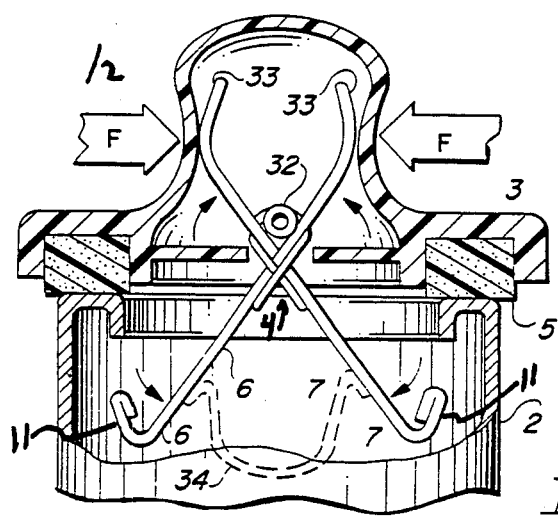

It will be clear to those skilled in the art that spring forcing the arms apart can be eliminated when the two arms are fabricated from a single piece of a resilient material such as spring steel. In this embodiment, the properties of the material itself forces the arm portions apart. The arms can also be include appropriate structure, such as slots for engaging the base member, so that the pin is no longer necessary. The fabrication of the fuel tank cap can be simplified by fabricating the base member 3 and the compressible member 5 from the same material as illustrated in FIG. 3A and FIG. 3B.

It will also be clear to those skilled in the art that the spring (in the preferred embodiment) or the resilient material (described above), used to provide a force to improve the effect of the coefficient of friction, can be replaced by a more elaborate mechanism for forcing the arms apart. However, the use of such mechanisms, for example a plunger type mechanism controlling the lateral extension of the arms, will also result in increased cost.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A fuel tank cap comprising:
   a base member;
   a compressible material coupled to said base member, wherein said compressible material comprised of a material impervious to fuel in said fuel tank; and
   a contractible member coupled to said base member and extending therethrough, said contractible member engaging an interior portion of said fuel tank when said cap is in an operational position, said contractible member being disengaged from said interior fuel tank portion by a force applied to said contractible member.

2. The fuel tank cap of claim 1 wherein said contractible member includes two arms and a spring, said spring positioned to force said two arm against said interior fuel tank portion.

3. The fuel tank cap of claim 2 further comprising a flexible material coupled to said base member, said flexible material enclosing said arms and said fuel tank when said fuel tank cap is in said operational position.

4. The fuel tank cap of claim 3, wherein ends of said arms extending into said fuel tank includes structure to engage a rim of said fuel tank when said force is not applied to said contractible member.

5. The fuel tank cap of claim 2 wherein said contractible member is fabricated from a single piece of resilient material.

6. The fuel tank cap of claim 2 wherein end portions of said arms have structure to increase a coefficient of friction between said arms and said fuel tank.

7. The method of enclosing a fuel tank comprising the steps of:
- engaging walls of a filler tube of said tank with a plurality of arms;
- providing a force for maintaining said arms in contact with said filler tube walls;
- enclosing said arms and an interior of said fuel tank with a compressible sealing material; and
- applying a force through said compressible material to release said arms from engaging said filler tube walls.

8. The method of enclosing a fuel tank of claim 7 further comprising the step of fabricating ends of said arms to increase a coefficient of friction between said arms and said filler tank walls.

9. The method of enclosing a fuel tank of claim 7 further comprising the step of fabricating said arms from a single piece of resilient material.

10. The method of enclosing a fuel tank of claim 7 further comprising the step of fabricating said arms to engage a rim of said filler tube.

11. A cap for sealing a filler tube of a fuel tank comprising:

compressible material generally shaped to engage rims of filler tubes having a plurality of diameters;
support material generally shaped to provide structural support for said compressible material;
a first and a second arm extending through said support material, said arms coupled at first ends, second arms of said arms extending into said filler tube when said compressible material engages said filler tube rim; and
force means coupled to said first and second arms, said force means forcing said arms against a wall of said filler tube.

12. The fuel tank cap of claim 11 further comprising a flexible cover coupled to said support material, said flexible cover enclosing said first ends of said first and second arms.

13. The fuel tube cap of claim 12 wherein a user can exert a force through said flexible cover and release said arms from said walls.

14. The fuel tank cap of claim 11 wherein said arm second ends are fabricated to increase a coefficient of friction between said arm ends and said filler tube walls.

15. The fuel tank cap of claim 11 wherein said support material and said compressible material are the same material.

16. The fuel tank cap of claim 11 wherein said arms have a structure to engage a flange located near said filler tube rim.

17. The fuel tank cap of claim 11 wherein said force means includes a spring.

18. The fuel tank cap of claim 11 wherein said first and said second arms are fabricated from a single piece of material, said force means including resilient properties of said single piece of material.

* * * * *